US00RE40954E

(19) United States
(12) Reissued Patent
Sasano et al.

(10) Patent Number: US RE40,954 E
(45) Date of Reissued Patent: Nov. 10, 2009

(54) OBJECTIVE LENS AND OPTICAL HEAD DEVICE

(75) Inventors: Tomohiko Sasano, Osaka (JP); Yasuhiro Tanaka, Hyogo (JP); Michihiro Yamagata, Osaka (JP)

(73) Assignee: Panasonic Corporation, Osaka (JP)

(21) Appl. No.: 10/999,236
(22) PCT Filed: Jul. 27, 2000
(86) PCT No.: PCT/JP00/05040

§ 371 (c)(1),
(2), (4) Date: Mar. 27, 2001

(87) PCT Pub. No.: WO01/13369

PCT Pub. Date: Feb. 22, 2001

Related U.S. Patent Documents

Reissue of:
(64) Patent No.: 6,490,100
Issued: Dec. 3, 2002
Appl. No.: 09/806,212
Filed: Mar. 27, 2001

(30) Foreign Application Priority Data

Jul. 30, 1999 (JP) ..... 11-216281
Jun. 15, 2000 (JP) ..... 2000-180406

(51) Int. Cl.
*G02B 7/00* (2006.01)

(52) U.S. Cl. ..... 359/719; 359/708; 359/718; 359/710; 369/112.2

(58) Field of Classification Search ..... 359/719, 359/708, 710, 718, 721, 743, 724; 369/112.12, 369/112.1, 112.23, 112.03, 112.05, 112.06, 369/112.07
See application file for complete search history.

(56) References Cited

U.S. PATENT DOCUMENTS 5,347,501 A * 9/1994 Iimura ..... 369/44.25
5,768,027 A * 6/1998 Takahashi ..... 359/637
6,181,670 B1 * 1/2001 Nagasato ..... 369/244
6,322,931 B1 * 11/2001 Cumpston ..... 430/1
6,339,579 B1 * 1/2002 Kamioka ..... 369/121

FOREIGN PATENT DOCUMENTS

| | | | |
|---|---|---|---|
| JP | 6-84195 | * | 3/1994 |
| JP | 8-201698 | * | 8/1996 |
| JP | 9-35319 | * | 2/1997 |
| JP | 9-91732 | * | 4/1997 |
| JP | 9-320083 | * | 12/1997 |
| JP | 10-91990 | * | 4/1998 |
| JP | 10-228653 | * | 8/1998 |
| JP | 10-275354 | * | 10/1998 |
| JP | 11-23960 | * | 1/1999 |
| JP | 11-64724 | * | 3/1999 |
| JP | 11-273123 | * | 10/1999 |

OTHER PUBLICATIONS

Dec. 12, 2000 International Search Report for PCT/JP00/05040.*

* cited by examiner

*Primary Examiner*—Timothy J Thompson
(74) *Attorney, Agent, or Firm*—McDermott Will & Emery LLP

(57) ABSTRACT

An objective lens (1) for an optical disk, which focuses a light beam from a light source, is designed so that a third-order coma aberration generated when the objective lens is inclined at a unit angle is larger than a third-order coma aberration generated when the optical disk (2) is inclined at the unit angle, mounted on an actuator for inclining the objective lens according to an inclination amount of the optical disk, and used. With this structure, it is possible to obtain an objective lens for an optical disk that has a large numerical aperture and is easy to manufacture and assemble, and in which the third-order coma aberration generated when the optical disk surface is inclined owing to a warp or the like can be corrected by small inclination of the objective lens, so as to reduce a residual astigmatism, which is generated according to the inclination amount, after the correction.

21 Claims, 7 Drawing Sheets

OBJECTIVE LENS AND OPTICAL HEAD DEVICE

Matter enclosed in heavy brackets [ ] appears in the original patent but forms no part of this reissue specification; matter printed in italics indicates the additions made by reissue.

TECHNICAL FIELD

The present invention relates to an objective lens for an optical disk that focuses a light beam from a light source on an information recording surface of the optical disk such as a digital video disk, a digital audio disk or an optical memory disk for a computer, and an optical head device using the same.

BACKGROUND ART

In optical head devices for optical disks, a single lens having an aspherical surface commonly is used as an objective lens for recording information or reproducing recorded information by focusing a light beam onto a diffraction-limited spot on an information recording surface of the optical disk.

In the following, a conventional optical head device will be described, with reference to an accompanying drawing.

FIG. 7 schematically shows a configuration of the conventional optical head device. As shown in FIG. 7, a light beam emitted from a semiconductor laser 151 is subjected to a change in direction of its optical path by a beam splitter 152, and turned into substantially parallel light by a collimator lens 153. The direction of the optical path of this light beam further is changed by a mirror 154 for bending the optical path, then this light beam is focused on an information recording surface 157 of an optical disk 156 by an objective lens 155. This objective lens 155 is driven by an actuator 160. The light beam that has been focused on the information recording surface 157 of the optical disk 156 is diffracted by roughness formed on the information recording surface 157. The light beam that has been reflected and diffracted by the information recording surface 157 of the optical disk 156 passes through the objective lens 155, is subjected to the change in the direction of the optical path by the mirror 154 for bending the optical path, passes through the collimator lens 153, the beam splitter 152 and a cylindrical lens 158, and is focused on a photo detector 159. Based on an electrical signal of the photo detector 159, the change in light quantity that has been modulated by the information recording surface 157 of the optical disk 156 is detected, thereby reading data on the information recording surface 157.

In the objective lens 155, a wavefront aberration may be generated because of a manufacturing error during manufacturing. This wavefront aberration theoretically can be divided into aberration components of a third-order spherical aberration, a third-order coma aberration, a third-order astigmatism and a high-order aberration.

Among these aberration components, the third-order coma aberration can be avoided by designed by forming a lens surface of the objective lens 155 to have a rotationally symmetric aspherical surface. However, in reality, decentration (displacement amount in a direction perpendicular to an optical axis) between a first surface 161 of the objective lens 155 on a parallel beam side and a second surface 162 thereof on a focusing side and tilt (inclination with respect to a surface perpendicular to the optical axis) of the first surface 161 of the objective lens 155, the second surface 162 thereof, or both surfaces are generated during manufacture and serve as predominant factors in generating the third-order coma aberration. Out of these two factors, the third-order coma aberration that is caused by the tilt is proportional to substantially the third power of NA (numerical aperture) of the objective lens 155.

In general, when a lens is inclined with respect to an optical axis, the third-order coma aberration is generated. Thus, by adjusting the angle of inclination, the generated third-order coma aberration can cancel out the third-order coma aberration due to the manufacturing error. For this purpose, the objective lens 155 of the optical head device is inclined during an assembly process of the optical head device, so as to reduce the third-order coma aberration. Such an operation is called "a tilt adjustment," and this angle of inclination is called "a tilt adjustment angle."

In recent years, an increasingly higher recording density has been achieved as seen in DVDs (digital video disks) or DVD-RAMs, for example. The key to achieving the densification is how small a spot can be formed on an optical disk, and it is known that the spot diameter can be reduced by increasing the numerical aperture of the lens. Accordingly, in order to achieve higher density, the numerical aperture of the lens gradually has become larger and larger, and now is 0.6 in DVDs. For a further densification, the numerical aperture has to be 0.6 or larger. Considering a manufacturing error during the manufacture of the lens or an assembly error during assembling on the optical head, lenses are designed conventionally so that the generation of decentration of the first surface and the second surface of the lens does not increase aberration and that the incidence of abaxial light does not increase aberration. In spite of a great demand, lenses with a larger numerical aperture have not been commercialized yet partly because, though it is easy to reduce only axial aberration in a lens design, it is very difficult to design a single lens having a sufficient tolerance while taking a manufacturing tolerance and an assembly tolerance into account.

Also, when the numerical aperture is raised, the third-order coma aberration that is caused by the inclination of the disk becomes larger. At present, there is a possibility that warping of the disk causes the inclination of about 0.5°, which generates the third-order coma aberration of about 70 mλ in an optical system with a numerical aperture of 0.6 and a focal length of 3.0 mm. In order that a spot is sufficiently small and reproducible in a DVD system, the third-order coma aberration is required to be not larger than 70 mλ. Thus, when considering the above-described third-order coma aberration generated by the inclination of the disk and the third-order coma aberration generated by the manufacturing error and the assembly error, it is impossible to record and reproduce data in this system.

When the lens having a numerical aperture of larger than 0.6 is designed by the design technique as described above, a satisfactory design is not possible because the aberration due to the decentration and the aberration due to the abaxial light generally are in an inversely proportional relationship. In other words, the lens becomes very difficult to manufacture or assemble. Also, when an optical disk is inclined with respect to an optical axis due to the warp of the disk or the like, a great deal of the third-order coma aberration is generated, so that it becomes impossible to record or reproduce data in this system.

DISCLOSURE OF INVENTION

The present invention is made in order to solve the conventional problems described above, and it is an object of the present invention to propose a new design concept for achieving a lens with a large numerical aperture and to provide an objective lens for an optical disk that has a large numerical aperture and is easy to manufacture and assemble, and an optical head device. It also is an object of the present invention to provide an objective lens for an optical disk and an optical head device that can compensate for performance deterioration due to an inclination of the disk.

In order to achieve the above-mentioned objects, the present invention has the following configuration.

An objective lens for an optical disk according to a first structure of the present invention focuses a light beam from a light source. A third-order coma aberration generated when the objective lens is inclined at a unit angle (for example, 0.5°) is larger than a third-order coma aberration generated when the optical disk is inclined at the same unit angle (for example, 0.5°). The objective lens is mounted on an actuator for inclining the objective lens according to an inclination amount of the optical disk.

With the first structure, the third-order coma aberration generated by the inclination of the optical disk can be corrected only by inclining the objective lens slightly. Also, since the inclination amount of the objective lens for this correction is small, the amount of astigmatism generated according to the inclination amount of the objective lens also is small. Thus, an excellent residual aberration after the correction is achieved. In addition, since the objective lens is mounted on the actuator and inclined according to the inclination amount of the optical disk, it is possible to provide an optical system that can suppress the generation of aberration due to a warp of the optical disk even when the warp is present.

More specifically, it is preferable that DC/LC>−0.9 is satisfied, where DC (mλ) represents a third-order coma aberration generated when the optical disk is inclined at 0.5° and LC (mλ) represents a third-order coma aberration generated when the objective lens is inclined at 0.5°. Furthermore, it is preferable that DC/LC>−0.8 is satisfied.

Also, in the first objective lens described above, it is preferable that a numerical aperture is equal to or larger than 0.62. With this structure, a spot diameter of the light beam on the optical disk can be made smaller, achieving a high density recording of the optical disk.

Also, in the first objective lens described above, it is preferable that DC+LC is at least 10 mλ and not larger than 40 mλn. The DC+LC of at least 10 mλ allows the third-order coma aberration generated by the inclination of the optical disk to be corrected only by inclining the objective lens slightly. Also, since the inclination amount of the objective lens for this correction is small, the amount of astigmatism generated according to the inclination amount of the objective lens also is small. Thus, an excellent residual aberration after the correction is achieved. Furthermore, the DC+LC of not larger than 40 mλ can suppress a deterioration of aberration characteristics when, because of vibration or the like, the objective lens is inclined unexpectedly. According to the above structure, excellent recording and/or reproducing become possible.

An objective lens for an optical disk according to a second structure of the present invention focuses a light beam from a light source and is used for a recordable and/or reproducible optical disk having a thickness (more precisely, a substrate thickness) of about 0.6 mm (more preferably 0.59 to 0.61 mm). A numerical aperture is at least 0.62 and not larger than 0.66. DC+LC is at least 10 mλ, where DC (mλ) represents a third-order coma aberration generated when the optical disk is inclined at 0.5° and LC (mλ) represents a third-order coma aberration generated when the objective lens is inclined at 0.5°. The objective lens is mounted on an actuator for inclining the objective lens according to an inclination amount of the optical disk. The objective lens is used in an optical system in which the objective lens is inclined so as to generate the third-order coma aberration, which cancels out the third-order coma aberration generated when the optical disk is inclined. A coefficient a is at least 30 and not larger than 35 when a relationship between X and Y is approximated by $Y=aX^2+bX+c$, where X (°) represents an angle of inclination of the optical disk and Y (mλ) represents an astigmatism that remains after canceling out the third-order coma aberration generated when the optical disk is inclined at X (°) by inclining the objective lens.

With the second structure, in recording and/or reproducing in a current DVD system, the third-order coma aberration generated by the inclination of the optical disk can be corrected only by inclining the objective lens slightly. Also, since the inclination amount of the objective lens for this correction is small, the amount of astigmatism generated according to the inclination amount of the objective lens also is small. Thus, an excellent residual aberration after the correction is achieved. In addition, since the objective lens is mounted on the actuator and inclined according to the inclination amount of the optical disk, it is possible to provide an optical system that can suppress the generation of aberration due to a warp of the optical disk even when the warp is present. Also, it is possible to suppress a deterioration of aberration characteristics when, because of vibration or the like, the objective lens is inclined unexpectedly. According to the above structure, excellent recording and/or reproducing become possible.

Next, an optical head device according to a first configuration of the present invention includes a light source, a collimating optical system for converting a light beam emitted from the light source into a substantially parallel light beam, an objective lens for focusing the substantially parallel light beam on an information recording surface of an optical disk, a light beam splitting member for splitting the light beam that has been modulated by the information recording surface of the optical disk, and a photo receiving member for receiving the light beam that has been modulated by the information recording surface of the optical disk. The objective lens is the first or the second objective lens described above.

With the first optical head device described above, the third-order coma aberration generated by the inclination of the optical disk can be corrected by only inclining the objective lens slightly. Also, since the inclination amount of the objective lens for this correction is small, the amount of astigmatism generated according to the inclination amount of the objective lens also is small. Thus, an excellent residual aberration after the correction is achieved. In addition, since the objective lens is mounted on the actuator and inclined according to the inclination amount of the optical disk, it is possible to suppress the generation of aberration due to a warp of the optical disk even when the warp is present. Accordingly, excellent recording and/or reproducing become possible.

In the first optical head device described above, it is preferable that the objective lens is subjected to a tilt adjustment so as to reduce a third-order coma aberration. With this configuration, since it is possible to reduce the third-order coma aberration due to errors during manufacturing lenses and assembling optical head devices by the tilt adjustment, the allowable extent of manufacturing error and assembly error is relaxed, thereby obtaining an inexpensive optical head device.

Next, an optical head device according to a second configuration of the present invention includes a light source, a collimating optical system for converting a light beam emitted from the light source into a substantially parallel light beam, an objective lens for focusing the substantially parallel light beam on an information recording surface of an optical disk, a light beam splitting member for splitting the light beam that has been modulated by the information recording surface of the optical disk, and a photo receiving member for receiving the light beam that has been modulated by the information recording surface of the optical disk. The objective lens has been subjected to a tilt adjustment so as to reduce a third-order coma aberration. A third-order coma aberration generated when the objective lens is inclined at a unit angle (for example, 0.5°) is larger than a third-order coma aberration generated when the optical disk is inclined at the unit angle (for example, 0.5°).

Furthermore, an optical head device according to a third configuration of the present invention includes a light source, a collimating optical system for converting a light beam emitted from the light source into a substantially parallel light beam, an objective lens for focusing the substantially parallel light beam on an information recording surface of an optical disk, a light beam splitting member for splitting the light beam that has been modulated by the information recording surface of the optical disk, and a photo receiving member for receiving the light beam that has been modulated by the information recording surface of the optical disk. The objective lens is subjected to a tilt adjustment so as to reduce a third-order coma aberration. $DC/LC>-0.9$ is satisfied, where DC (mλ) represents a third-order coma aberration generated when the optical disk is inclined at 0.5° and LC (mλ) represents a third-order coma aberration generated when the objective lens is inclined at 0.5°. Furthermore, it is preferable that $DC/LC>-0.8$ is satisfied.

Moreover, an optical head device according to a fourth configuration of the present invention includes a light source, a collimating optical system for converting a light beam emitted from the light source into a substantially parallel light beam, an objective lens for focusing the substantially parallel light beam on an information recording surface of an optical disk having a thickness (more precisely, a substrate thickness) of about 0.6 mm (more preferably 0.59 to 0.61 mm), a light beam splitting member for splitting the light beam that has been modulated by the information recording surface of the optical disk, and a photo receiving member for receiving the light beam that has been modulated by the information recording surface of the optical disk. The objective lens has a numerical aperture of at least 0.62 and not larger than 0.66 and has been subjected to a tilt adjustment so as to reduce a third-order coma aberration. DC+LC is at least 10 mλ, where DC (mλ) represents a third-order coma aberration generated when the optical disk is inclined at 0.5° and LC (mλ) represents a third-order coma aberration generated when the objective lens is inclined at 0.5°. A coefficient a is at least 30 and not larger than 35 when a relationship between X and Y is approximated by $Y=aX^2+bX+c$, where X (°) represents an angle of inclination of the optical disk and Y (mλ) represents an astigmatism that remains after canceling out the third-order coma aberration generated when the optical disk is inclined at X (°) by inclining the objective lens.

With the second to fourth optical head devices described above, since the objective lens has been subjected to the tilt adjustment so as to reduce the third-order coma aberration, it is possible to reduce the third-order coma aberration due to errors during manufacturing lenses and assembling optical head devices. Thus, an allowable extent of a manufacturing error and an assembly error is relaxed, thereby obtaining an inexpensive optical head device.

Also, the third-order coma aberration generated by the inclination of the optical disk can be corrected by only inclining the objective lens slightly. Moreover, since the inclination amount of the objective lens for this correction is small, the amount of astigmatism generated according to the inclination amount of the objective lens also is small. Thus, an excellent residual aberration after the correction is achieved, and excellent recording and/or reproducing become possible.

In addition to the above, according to the fourth optical head device, it is possible to suppress a deterioration of aberration characteristics when, because of vibration or the like, the objective lens is inclined unexpectedly. Accordingly, excellent recording and/or reproducing become possible in a current DVD system.

Next, a method for manufacturing an optical head device according to the present invention is a method for manufacturing an optical head device including a light source, a collimating optical system for converting a light beam emitted from the light source into a substantially parallel light beam, the first or the second objective lens for focusing the substantially parallel light beam on an information recording surface of an optical disk, a light beam splitting member for splitting the light beam that has been modulated by the information recording surface of the optical disk, and a photo receiving member for receiving the light beam that has been modulated by the information recording surface of the optical disk. After the light source and the collimating optical system are placed, the objective lens is disposed while being inclined such that a coma aberration of a wavefront of the light beam from the objective lens decreases (in other words, while being subjected to the tilt adjustment).

With the above configuration, since the objective lens is disposed while being subjected to the tilt adjustment, it is possible to reduce the third-order coma aberration due to errors during manufacturing lenses and assembling optical head devices. Thus, the allowable extent of manufacturing error and assembly error is relaxed, thereby obtaining an inexpensive optical head device.

Also, by using the first or the second objective lens, the third-order coma aberration generated by the inclination of the optical disk can be corrected by only inclining the objective lens slightly. Also, since the inclination amount of the objective lens for this correction is small, the amount of astigmatism generated according to the inclination amount of the objective lens also is small. Thus, an excellent residual aberration after the correction is achieved. Moreover, since the objective lens is mounted on the actuator and inclined according to the inclination amount of the optical disk, it is possible to provide the optical system that can suppress the generation of aberration due to a warp of the optical disk even when the warp is present.

As described above, it is possible to obtain an inexpensive optical head device in which excellent recording and/or reproducing are possible.

BEST MODE FOR CARRYING OUT THE INVENTION

In the following, the present invention will be described more specifically, by referring to embodiments.

(First Embodiment)

Figure 1:
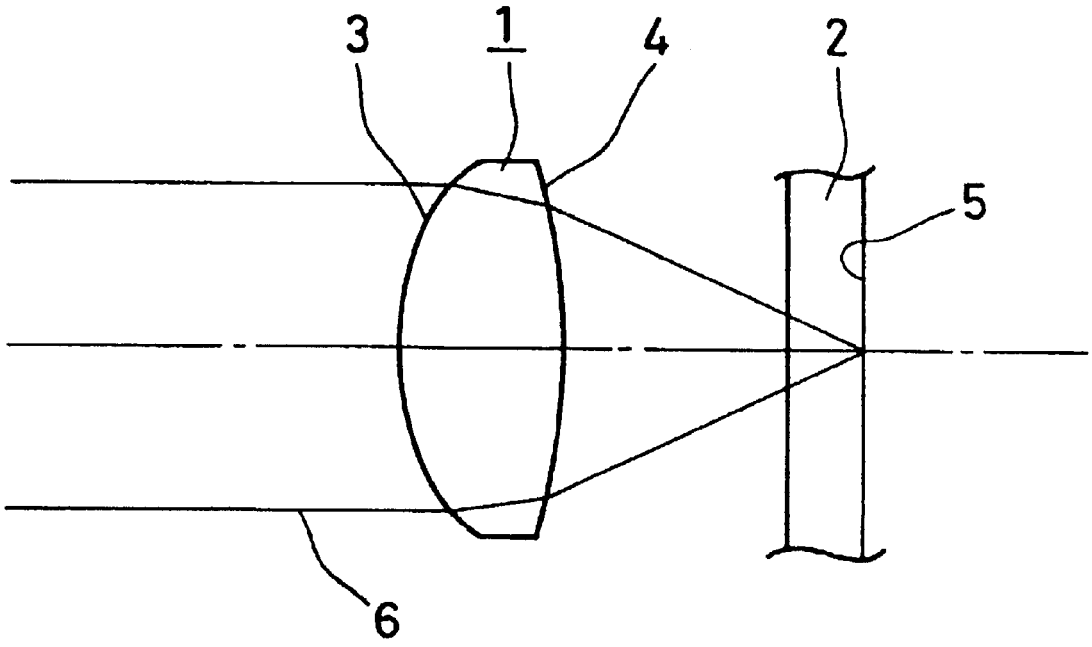
FIG. 1 shows optical paths showing a focusing state by an objective lens in a first embodiment of the present invention.

FIG. 1 shows a focusing state by an objective lens in the first embodiment of the present invention. As shown in FIG. 1, a parallel light beam 6 enters an objective lens 1 from a first surface 3, which is a surface on a light source side, leaves from a second surface 4, which is a surface on a disk side, then passes through a substrate of an optical disk 2 so as to be focused on an information recording surface 5.

The following is a specific numerical example of the present invention. The first surface of the objective lens corresponds to the surface on the light source side, while the second surface thereof corresponds to the surface on the disk side (focusing side). The optical disk is a parallel plate. Furthermore, the designed wavelength is 655 nm, and the refractive index of the optical disk substrate is 1.56. Various characters are defined as follows.

f: focal length of the objective lens (mm)

R1: radius of curvature of the first surface of the objective lens (mm)

R2: radius of curvature of the second surface of the objective lens (mm)

d: thickness of the objective lens (mm)

n: refractive index of the objective lens t: thickness of the substrate of the optical disk (mm)

NA: numerical aperture of the objective lens when focusing a light beam through the optical disk The aspherical shape of the objective lens 1 for the optical disk is given by the following formula (1).

$$\frac{c_j h^2}{1+\sqrt{\{1-(1+k_j)c_j^2h^2\}}}+\sum_{i=1}^{n} A_{j,i}h^j \tag{1}$$

where h: height from an optical axis ($h=(x^2+y^2)^{1/2}$)

$c_j$: curvature of a vertex of a lens surface of a j-th surface ($c_j=1/R_j$, $R_j$ is radius of curvature)

$k_j$: conic constant of a j-th surface $A_{j,i}$: i-th order aspherical coefficient of a j-th surface.

In addition, parameters indicating performance of the objective lens are defined as follows.

WO: minimum square error of axial wavefront aberration (unit is mλ (mλ is a unit equal to one-thousandth of wavelength λ))

DC: third-order coma aberration generated when the optical disk is inclined at 0.5° (mλ, negative sign)

LC: third-order coma aberration generated when the objective lens is inclined at 0.5° (mλ, positive sign)

TH: angle of inclination of the objective lens that can cancel out the third-order coma aberration generated when the optical disk is inclined at 0.5° (°)

The following is a specific numerical example.

f=3.05

R1=2.00300

R2=−15.33015 d=1.692 n=1.60297 t=0.6

NA=0.65

$k1=-6.765663\times10^{-1}$ $A1,4=2.527642\times10^{-3}$ $A1,6=1.525075\times10^{-4}$ $A1,8=-2.502308\times10^{-5}$ $A1,10=-6.699123\times10^{-6}$ $k2=-6.707921\times10^{+1}$ $A2,4=5.385577\times10^{-3}$ $A2,6=-1.818641\times10^{-3}$ $A2,8=2.990897\times10^{-4}$ $A2,10=-2.064762\times10^{-5}$

WO=3.4

DC=−66.8

LC=85.7

TH=0.39

Figure 2:
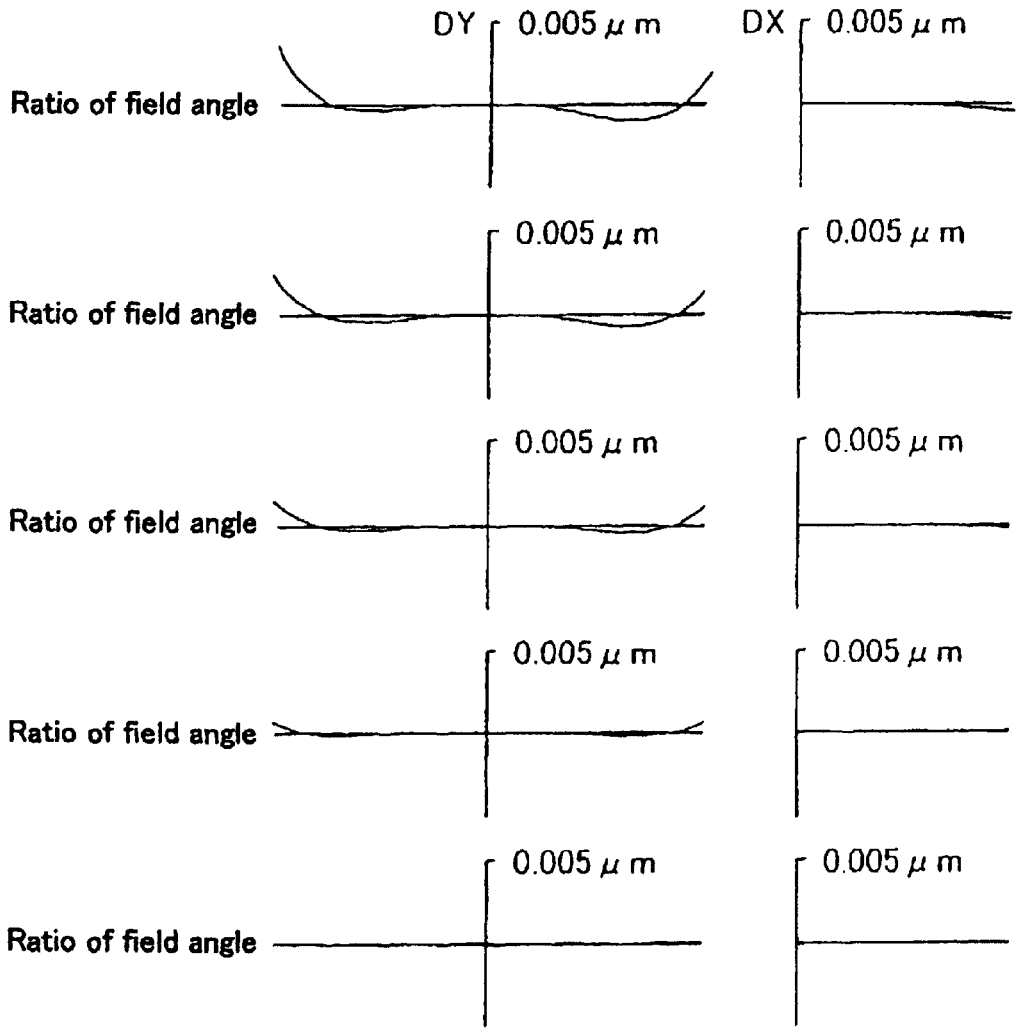
FIG. 2 shows the aberration of an objective lens in a numerical example in the first embodiment of the present invention.
Figure 3:
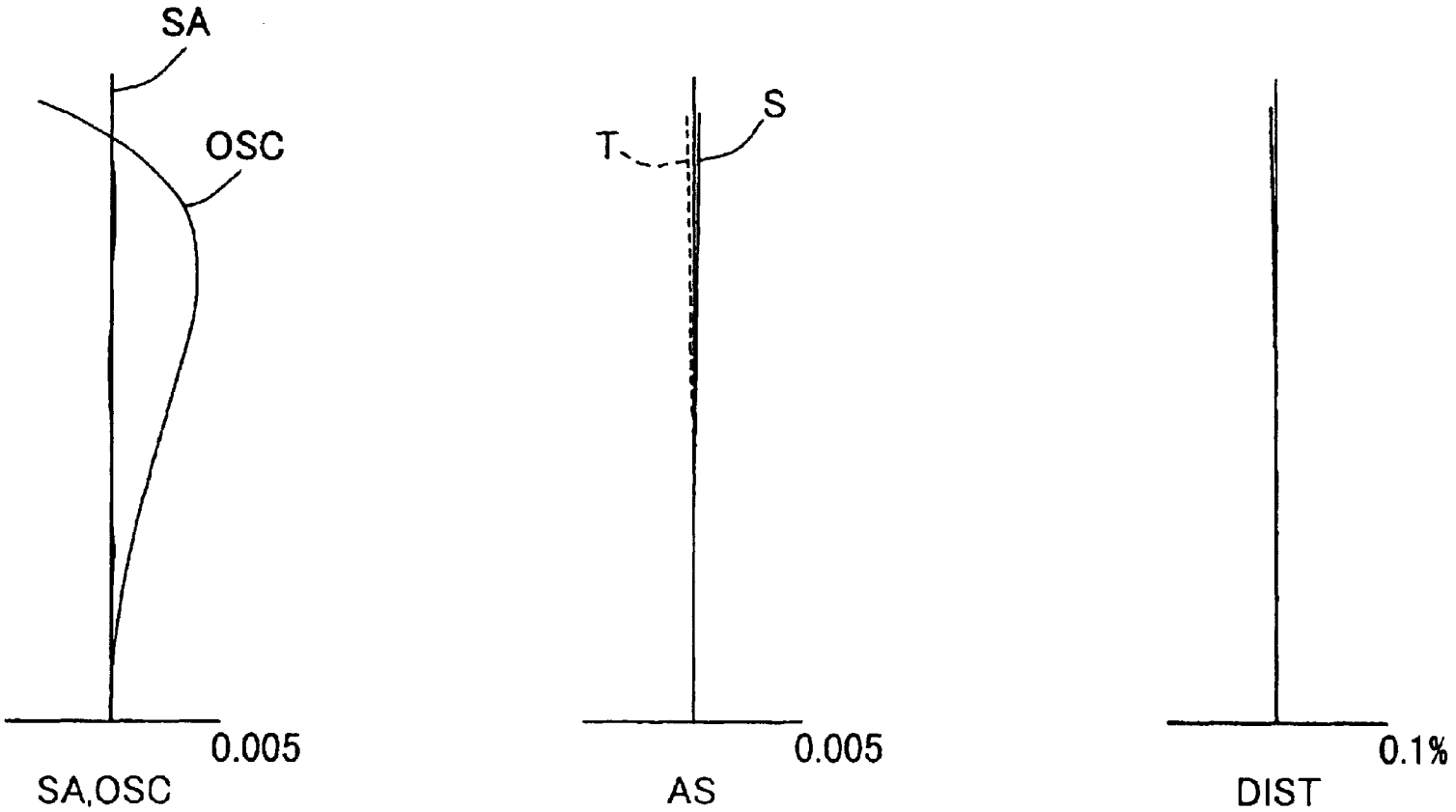
FIG. 3 shows the aberration of the objective lens in the numerical example in the first embodiment of the present invention.

FIGS. 2 and 3 show the aberration of this objective lens.

FIG. 2 shows transverse aberration of the objective lens when the ratios of field angle are changed. The ratio of field angle of 1.0 corresponds to the state where abaxial light at 0.5° enters the objective lens, while that of 0 corresponds to that where axial light enters the objective lens. In the figure, DY represents the transverse aberration in Y-axis direction, and DX represents the transverse aberration in X-axis direction.

Also, in FIG. 3, SA represents spherical aberration, and OSC represents a sine condition. AS represents astigmatism, T represents a tangential direction, and S represents a sagittal direction. Also, DIST represents distortion (field curvature).

The objective lens of the present numerical example has an axial wavefront aberration WO of 3.4 mλ, which is being suppressed at a low level. Thus, the deterioration is small in the vicinity of the center of the spot. As a result, when detecting the signal recorded on an information medium surface of the optical disk, it is possible to reduce crosstalk from adjacent signals.

Also, the third-order coma aberration DC generated when the optical disk is inclined at 0.5° is −66.8 mλ, while the third-order coma aberration LC generated when the objective lens is inclined at 0.5° is 85.7 mλ, achieving the relationship of DC/LC=−0.78>−0.8. Accordingly, the angle TH of inclination of the objective lens that is required for canceling out the third-order coma aberration generated when the optical disk is inclined at 0.5° can be reduced to 0.39°. In other words, when the third-order coma aberration generated by the inclination of the optical disk is corrected by inclining the objective lens, the amount of this inclination of the objective lens can be suppressed to a small degree. On the other hand, since the astigmatism is generated approximately in proportion to the second power of the inclination of the objective lens, the astigmatism generated when correcting the third-order coma aberration can be suppressed to a lower level. Therefore, it becomes possible to record and/ or reproduce data in an excellent manner even when correcting the third-order coma aberration.

Furthermore, the numerical aperture NA of the objective lens is 0.65. The numerical aperture NA equal to or larger than 0.62 is preferable because it allows recording with a still higher density.

Also, DC+LC equals 18.9 mλ. Accordingly, when the optical axis of the objective lens is arranged in parallel to a normal direction of the optical disk surface, the incidence of a light beam that is inclined at 0.5° with respect to the optical axis into the objective lens generates the third-order coma aberration. DC+LC of at least 10 mλ is preferable because, when the third-order coma aberration generated at the time of the inclination of the optical disk is canceled out by inclining the objective lens, the amount of this inclination of the objective lens is small. Also, DC+LC of not larger than 40 mλ is preferable because, when the objective lens is inclined with respect to the optical axis owing to vibration of an actuator or the like, the deterioration amount (amount of generated aberration) is suppressed to a small level.

Figure 4:
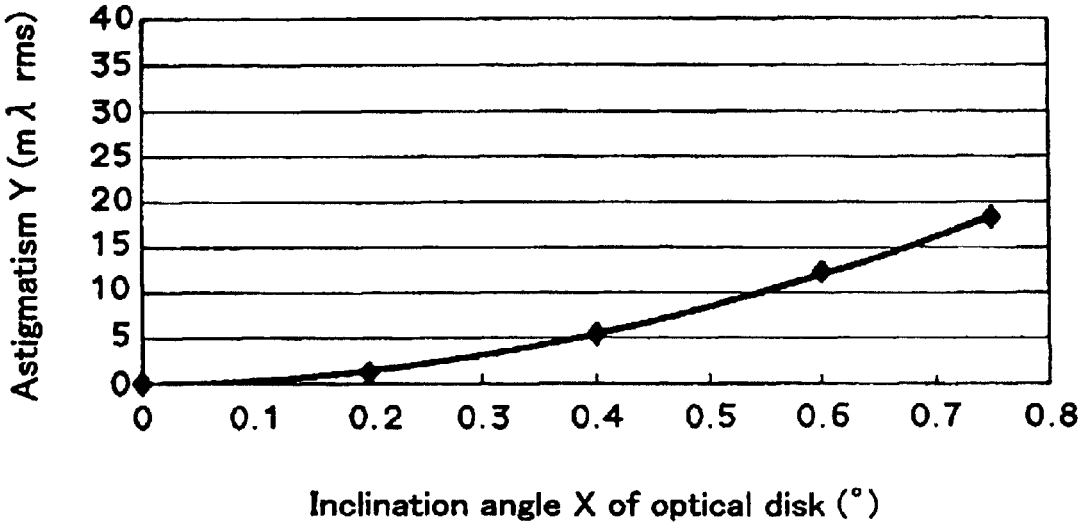
FIG. 4 shows a relationship between an inclination amount of an optical disk and a residual astigmatism amount after a third-order coma aberration correction in the numerical example in the first embodiment of the present invention.

Now, in the above numerical example, the angle X (°) of inclination of the optical disk is indicated by the axis of abscissa, and the astigmatism Y (mλ) that remains after canceling out the third-order coma aberration generated when the optical disk is inclined at X (°) by inclining the objective lens is indicated by the axis of ordinate, thus obtaining a curve shown in FIG. 4. When this curve is fitted with a quadratic curve expressed by $Y=aX^2+bX+c$, each coefficient achieves; a=31.197, b=1.4089, and c=−0.1304 (minimum square error=0.999). The quadratic coefficient a of at least 30 is preferable because the tolerance for swaying of the objective lens is relaxed (in other words, the astigmatism amount generated when the objective lens is inclined owing to vibration or the like can be suppressed at a small level), thus raising an allowable degree of mechanism design of an objective lens supporting system. Also, the coefficient a of not larger than 35 is preferable because a correction effect for the third-order coma aberration generated by the inclination of the optical disk is produced.

In addition, the substrate of the optical disk has a thickness t=0.6 mm in the above numerical example. The thickness of the substrate of about 0.6 mm (0.59 to 0.61 mm in particular) is preferable because it makes the recording and/or reproducing of the DVD easier.

(Second Embodiment)

Figure 5:
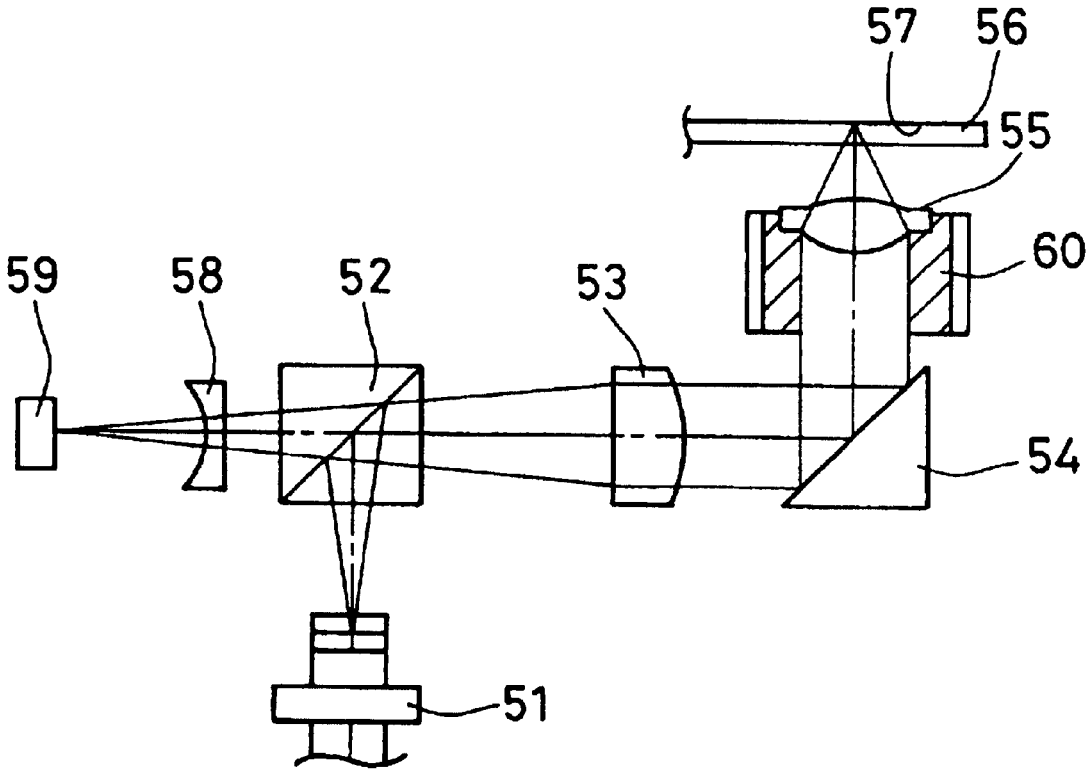
FIG. 5 shows a configuration of an optical head device in a second embodiment of the present invention.

FIG. 5 shows a configuration of an optical head device in the second embodiment using a single objective lens for an optical disk.

As shown in FIG. 5, a light beam emitted from a semiconductor laser 51 is subjected to a change in a direction of optical path by a beam splitter 52, and turned into substantially parallel light by a collimator lens 53. The direction of the optical path of this light beam further is changed by a mirror 54 for bending the optical path, and then this light beam is focused on an information recording surface 57 of an optical disk 56 by a single objective lens 55 for the optical disk of the present invention described in the first embodiment. This objective lens 55 is driven by an actuator 60. The light beam that has been focused on the information recording surface 57 of the optical disk 56 is diffracted by roughness formed on the information recording surface 57. The light beam that has been reflected and diffracted by the information recording surface 57 of the optical disk 56 passes through the objective lens 55, is subjected to the change in the direction of the optical path by the mirror 54 for bending the optical path, passes through the collimator lens 53, the beam splitter 52 and a cylindrical lens 58, and is focused on a photo detector 59. Based on an electric signal of the photo detector 59, the change in light quantity that has been modulated by the information recording surface 57 of the optical disk 56 is detected, thereby reading data on the information recording surface 57.

A manufacturing process of such an optical head device preferably includes first fixing a light source (the semiconductor laser 51) and the collimator lens 53, further the beam splitter 52 and the mirror 54 for bending the optical path optionally, then carrying out a tilt adjustment (an inclination adjustment) of the objective lens 55. The tilt adjustment is carried out by, for example, observing a focusing state after the light from the semiconductor laser 51 passes through the objective lens 55, inclining the objective lens 55 or the actuator 60 supporting the objective lens 55 with respect to an optical head base (not shown in the figure) in such a manner that a third-order coma aberration is smallest or an optical spot blurring is minimum, then fixing the objective lens 55 or the actuator 60. The inclination of the objective lens 55 or the actuator 60 can be provided by using, for example, an adjusting screw. With this manufacturing process, no abaxial light enters the objective lens 55. Thus, only an abaxial tilt aberration of the lens influences a lens performance, leading to an improvement of yield in an assembly step for the optical head device.

A warp or an inclination of the optical disk 56 causes the third-order coma aberration. This is corrected by inclining the objective lens 55 by the actuator 60 on which the objective lens 55 is mounted in accordance with an inclination amount of the optical disk 56 or the third-order coma aberration generated based on this inclination amount. A specific configuration for detecting the inclination amount of the optical disk 56 or the third-order coma aberration due to this inclination amount is not limited particularly but may be a known configuration.

Figure 6:
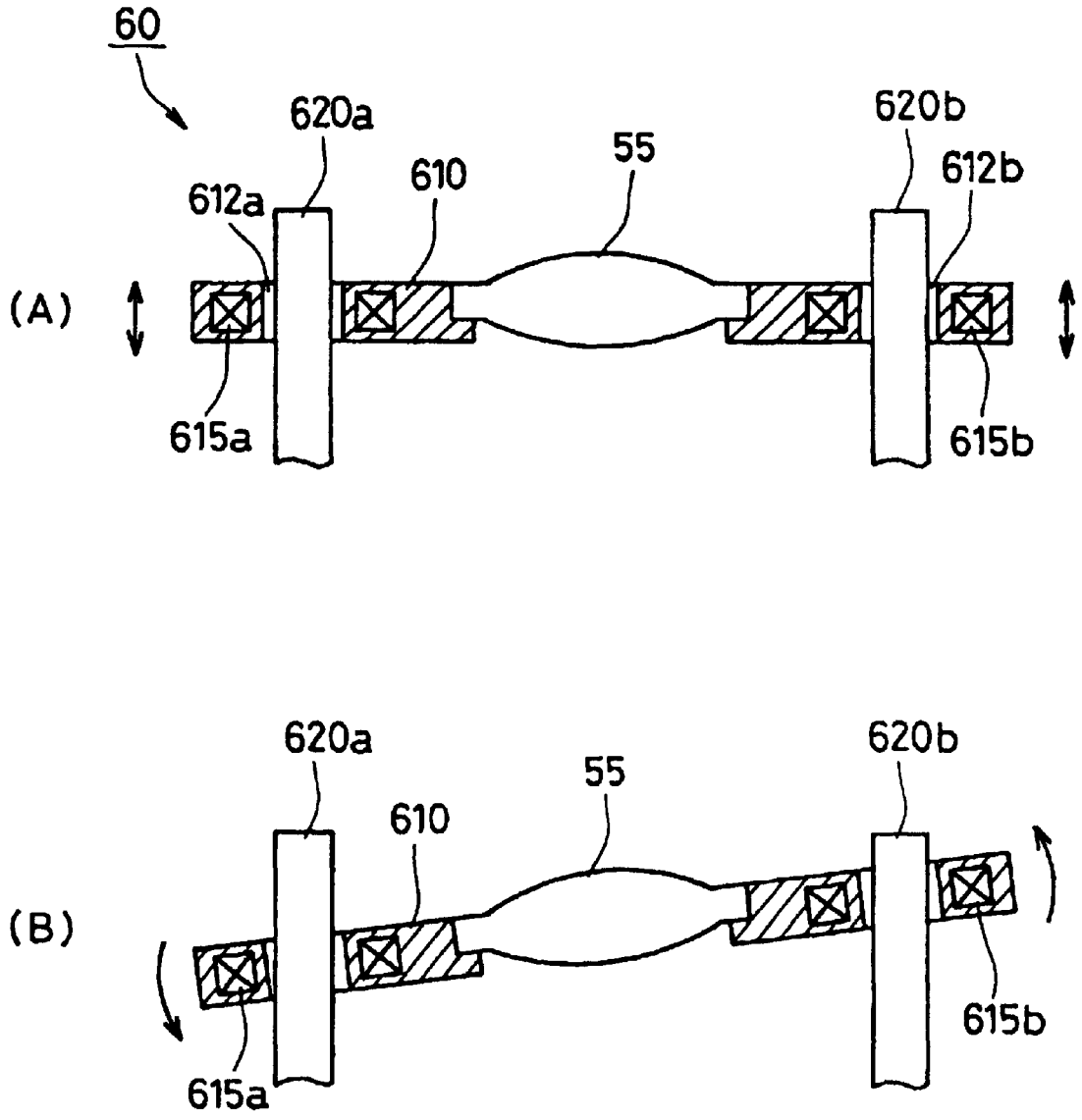
FIGS. 6(A) and 6(B) show cross-sections for explaining an operation in an example of an actuator providing an objective lens with an inclination.
Figure 7:
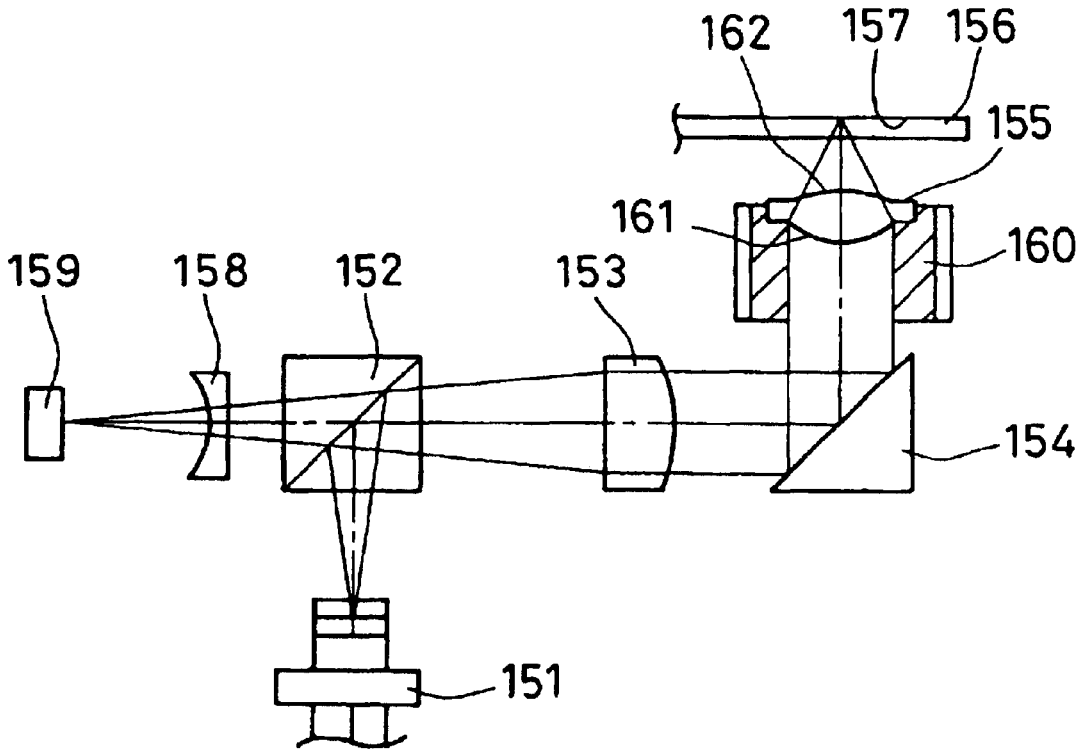
FIG. 7 shows a configuration of a conventional optical head device.

FIG. 6 shows a structural example of the actuator 60 for inclining the objective lens 55. In FIGS. 6(A) and 6(B), numeral 55 denotes the objective lens, numeral 610 denotes a lens holder for supporting the objective lens 55, numerals 612a and 612b denote through holes provided in the lens holder 610, numerals 615a and 615b denote substantially ring-shaped coils provided in the lens holder 610 so as to surround the through holes 612a and 612b respectively, and numerals 620a and 620b denote a pair of permanent magnets passing through the through holes 612a and 612b with clearance. The pair of the permanent magnets 620a and 620b have a polarity in the same direction and are provided in the optical head base. The lens holder 610 is supported by the optical head base via an elastic member, which is not shown in the figure. The actuator 60 also is used as an actuator for focusing and tracking of the objective lens 55. A focusing adjustment is conducted by passing electric current in the same direction through the pair of the coils 615a and 615b so as to move the objective lens 55 in a vertical direction of the sheet as shown in FIG. 6(A). On the other hand, when the electric current in the opposite directions is passed through the pair of the coils 615a and 615b (alternatively, the electric current is passed through only one of the pair of the coils 615a and 615b), the objective lens 55 can be inclined as shown in FIG. 6(B). By utilizing this principle and providing a pair of the permanent magnets and a pair of the coils in each of tangential and radial directions of the optical disk, the objective lens 55 can be inclined in any direction with respect to the optical disk. Since a detrimental third-order coma aberration due to an inclination of the optical disk often is caused by the inclination in the tangential direction, simply providing a pair of the permanent magnets and a pair of the coils in the tangential direction alone can correct most of the third-order coma aberration caused by the inclination of the optical disk. It is needless to say that the structure of the actuator 60 for providing the objective lens 55 with an inclination is not limited to that shown in FIG. 6.

NA required for an optical disk to be read out from or recorded on depends on the recording density of this optical disk. In order to achieve a high density recording, high NA generally is used. Since a manufacturing tolerance and an assembly tolerance become tight with an increase in NA, NA is restricted up to about 0.6 in a current process. On the other hand, the use of the objective lens of the first embodiment having the above design as the objective lens 55 can suppress the aberration at a low level after the tilt adjustment even when NA of this objective lens 55 is raised to 0.62 or larger, and thus the tolerance in the manufacturing steps of the optical head device is relaxed, leading to an improvement of the yield, allowing a mass-production.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An objective lens [for an optical disk, which focuses] *for focusing* a light beam from a light source *on an optical medium*, wherein DC/LC>−0.9 is satisfied, where DC (mλ) represents a third-order coma aberration generated when the optical [disk] *medium* is inclined at 0.5° and LC (mλ) represents a third-order coma aberration generated when the objective lens is inclined at 0.5°[, and the objective lens is mounted on an actuator for inclining the objective lens according to an inclination amount of the optical disk].

2. The objective lens [for the optical disk] according to claim 1, further satisfying DC/LC>−0.8.

3. The objective lens [for the optical disk] according to claim 1, wherein DC+LC is at least 10 mλ and not larger than 40 mλ.

4. An objective lens for [for the optical disk, which focuses] *focusing* a light beam from a light source [and is used for a recordable and/or reproducible] *on an optical medium for recording information on, or reproducing information from, the* optical [disk having a thickness of about 0.6 mm] medium, wherein a numerical aperture is at least 0.62 and not larger than 0.66, DC+LC is at least 10 mλ, where DC (mλ) represents a third-order coma aberration generated when the optical [disk] *medium* is inclined at 0.5° and LC (mλ) represents a third-order coma aberration generated when the objective lens is inclined at 0.5°, *and*

[the objective lens is mounted on an actuator for inclining the objective lens according to an inclination amount of the optical disk, the objective lens is used in an optical system in which the objective lens is inclined so as to generate the third-order coma aberration, which cancels out the third-order coma aberration generated when the optical disk is inclined, and]

a coefficient a is at least 30 and not larger than 35 when a relationship between X and Y is approximated by $Y=aX^2+bX+c$, where X (°) represents an angle of inclination of the optical [disk] *medium* and Y (mλ) represents an astigmatism that remains after canceling out the third-order coma aberration generated when the optical [disk] *medium* is inclined at X (°) by inclining the objective lens.

5. An optical head device comprising:

a light source;

[a collimating optical system for converting a light beam emitted from the light source into a substantially parallel light beam;]

an objective lens for focusing [the substantially parallel light beam] *a light beam emitted by the light source* on an information recording surface of an optical [disk] *medium*;

a light beam [splitting member] *splitter* for splitting [the] *a* light beam that has been modulated by the information recording surface of the optical [disk] *medium*; and a photo*detector* [receiving member] for receiving the light beam that has been modulated by the information recording surface of the optical [disk;] *medium,* wherein the objective lens is subjected to a tilt adjustment so as to reduce a third-order coma aberration, and DC/LC>−0.9 is satisfied, where DC (mλ) represents a third-order coma aberration generated when the optical [disk] *medium* is inclined at 0.5° and LC (mλ) represents a third-order coma aberration generated when the objective lens is inclined at 0.5°.

6. An optical head device comprising:

a light source;

[a collimating optical system for converting a light beam emitted from the light source into a substantially parallel light beam;]

an objective lens for focusing [the substantially parallel light beam] *a light beam emitted by the light source* on an information recording surface of an optical [disk] *medium* having a thickness of about 0.6 mm;

a light beam [splitting member] *splitter* for splitting the light beam that has been modulated by the information recording surface of the optical [disk] *medium*; and a photo*detector* [receiving member] for receiving the light beam that has been modulated by the information recording surface of the optical [disk] *medium*;

wherein the objective lens has a numerical aperture of at least 0.62 and not larger than 0.66 and is subjected to a tilt adjustment so as to reduce a third-order coma aberration, DC+LC is at least 10 mλ, where DC (mλ) represents a third-order coma aberration generated when the optical [disk] *medium* is inclined at 0.5° and LC (mλ) represents a third-order coma aberration generated when the objective lens is inclined at 0.5°, and a coefficient a is at least 30 and not larger than 35 when a relationship between X and Y is approximated by $Y=aX^2+bX+c$, where X (°) represents an angle of inclination of the optical [disk] *medium* and Y (mλ) represents an astigmatism that remains after canceling out the third-order coma aberration generated when the optical [disk] *medium* is inclined at X (°) by inclining the objective lens.

7. The objective lens for the optical [disk] *medium* according to claim 1, wherein a numerical aperture is equal to or larger than 0.62.

8. An optical head device comprising:

a light source;

[a collimating optical system for converting a light beam emitted from the light source into a substantially parallel light beam;]

an objective lens for focusing [the substantially parallel light beam] *a light beam emitted by the light source* on an information recording surface of an optical [disk] *medium*;

a light beam [splitting member] *splitter* for splitting the light beam that has been modulated by the information recording surface of the optical [disk] *medium*; and a photo*detector* [receiving member] for receiving the light beam that has been modulated by the information recording surface of the optical [disk] *medium*;

wherein the objective lens is the objective lens according to claim 1.

9. An optical head device comprising:

a light source;

[a collimating optical source for converting a light beam emitted from the light source into a substantially parallel light beam;]

an objective lens for focusing the substantially parallel light beam on an information recording surface of an optical [disk] *medium*;

a light beam [splitting member] *splitter* for splitting the light beam that has been modulated by the information recording surface of the optical [disk] *medium*; and a photo*detector* [receiving member] for receiving the light beam that has been modulated by the information recording surface of the optical [disk] *medium*;

wherein the objective lens is the objective lens according to claim [6] *4*.

10. A method for manufacturing an optical head device, [the optical head device] comprising *the steps of*:

*positioning* a light source;

[a collimating optical system for converting a light beam emitted from the light source into a substantially parallel light beam;]

*positioning* an objective lens according to claim 1 for focusing [the substantially parallel light beam] *a light beam emitted by the light source* on an information recording surface of an optical [disk] *medium while being inclined such that a coma aberration of a wavefront of the light beam from the objective lens decreases*;

*positioning* a light beam [splitting member] *splitter* for splitting [the] *a* light beam that has been modulated by the information recording surface of the optical [disk] *medium*; and

*positioning* a photo*detector* [receiving member] for receiving the light beam that has been modulated by the information recording surface of the optical [disk;

wherein, after the light source and the collimating optical system are placed, the objective lens is disposed while being inclined such that a coma aberration of a wavefront of the light beam from the objective lens decreases] *medium*.

11. A method for manufacturing an optical head device, [the optical head device] comprising *the steps of*:

*positioning* a light source;

[a collimating optical system for converting a light beam emitted from the light source into a substantially parallel light beam;]

*positioning* an objective lens according to claim 4 for focusing [the substantially parallel light beam] *a light beam emitted by the light source* on an information recording surface of an optical [disk] *medium while being inclined such that a coma aberration of a wavefront of the light beam from the objective lens decreases*;

*positioning* a light beam [splitting member] *splitter* for splitting [the] *a* light beam that has been modulated by the information recording surface of the optical [disk] *medium*; and

*positioning* a photo*detector* [receiving member] for receiving the light beam that has been modulated by the information recording surface of the optical [disk;

wherein, after the light source and the collimating optical system are placed, the objective lens is disposed while being inclined such that a coma aberration of a wavefront of the light beam from the objective lens decreases] *medium*.

12. The optical head device according to claim 8, wherein the objective lens is subjected to a tilt adjustment so as to reduce a third-order coma aberration.

13. The optical head device according to claim 9, wherein the objective lens is subjected to a tilt adjustment so as to reduce a third-order coma aberration.

*14. An optical head device comprising:*

*an objective lens for focusing a light beam onto a surface of an optical medium;*

*a detector for detecting either an inclination of the optical medium or the third-order coma aberration generated based on the inclination; and*

*an actuator for inclining the objective lens based on either the inclination amount or the third-order coma aberration detected by the detector,*

*wherein DC/LC>−0.9 is satisfied, where DC (mλ) represents a third-order coma aberration generated when the optical medium is inclined at 0.5° and LC (mλ) represents a third-order coma aberration generated when the objective lens is inclined at 0.5°.*

*15. The optical head device according to claim 14, wherein the objective lens is subjected to a tilt adjustment so as to reduce the third-order coma aberration.*

*16. The optical head device according to claim 14, wherein DC/LC>−0.8 is satisfied.*

*17. The optical head device according to claim 14, wherein DC+LC is at least 10 mλ and not larger than 40 mλ.*

*18. An apparatus for recording information and/or reproducing recorded information on the surface of an optical medium, comprising:*

*a light source;*

*an objective lens for focusing a light beam from the light source onto the surface of the optical medium;*

*a detector for detecting either an inclination of the optical medium or the third-order coma aberration generated based on the inclination;*

*a light beam splitter for splitting a light beam that has been modulated by the information recording surface of the optical medium; and*

*a photodetector for receiving the light beam that has been modulated by the surface of the optical medium, and*

*an actuator for inclining the objective lens based on either the inclination amount or the third-order coma aberration detected by the detector,*

*wherein DC/LC>−0.9 is satisfied, where DC (mλ) represents a third-order coma aberration generated when*

*the optical medium is inclined at 0.5° and LC (mλ) represents a third-order coma aberration generated when the objective lens is inclined at 0.5°.*

*19. The apparatus according to claim 18, wherein the objective lens is subjected to a tilt adjustment so as to reduce the third-order coma aberration.*

*20. The apparatus according to claim 18, wherein DC/LC>−0.8 is satisfied.*

*21. The apparatus according to claim 18, wherein DC+LC is at least 10 mλ and not larger than 40 mλ.*

* * * * *